United States Patent [19]

Zeidler et al.

[11] Patent Number: 4,842,306
[45] Date of Patent: Jun. 27, 1989

[54] PIPE COUPLING

[75] Inventors: Siegmund Zeidler, Hanau; Manfred Krüger, Büdingen, both of Fed. Rep. of Germany

[73] Assignee: Rasmussen GmbH, Maintal, Fed. Rep. of Germany

[21] Appl. No.: 173,250

[22] Filed: Mar. 24, 1988

[30] Foreign Application Priority Data

Apr. 1, 1987 [DE] Fed. Rep. of Germany ....... 3710852

[51] Int. Cl.$^4$ .............................................. F16L 21/06
[52] U.S. Cl. .................................... 285/104; 285/373; 285/340; 285/903
[58] Field of Search ............... 285/373, 372, 369, 903, 285/417, 418, 419, 420, 104, 340

[56] References Cited

U.S. PATENT DOCUMENTS

| | | | |
|---|---|---|---|
| 1,898,623 | 2/1933 | Gammeter | 285/104 |
| 2,020,554 | 11/1935 | Johnson | 285/104 |
| 2,225,208 | 12/1940 | Crickmer . | |
| 2,227,551 | 1/1941 | Morris | 285/373 |
| 2,449,795 | 9/1948 | Stillwagon | 285/373 |
| 2,459,251 | 1/1949 | Stillwagon . | |
| 3,116,078 | 12/1963 | Scherer | 285/373 |
| 4,664,422 | 5/1987 | Straub | 285/373 |
| 4,715,626 | 12/1987 | Gehring et al. | 285/373 |
| 4,729,582 | 3/1988 | Zeidler | 285/373 |

FOREIGN PATENT DOCUMENTS

| | | | |
|---|---|---|---|
| 911358 | 11/1962 | Fed. Rep. of Germany . | |
| 2508424 | 9/1976 | Fed. Rep. of Germany | 285/373 |
| 3443943 | 6/1985 | Fed. Rep. of Germany . | |
| 3440258 | 5/1986 | Fed. Rep. of Germany . | |
| 3445807 | 6/1986 | Fed. Rep. of Germany | 285/373 |
| 98139 | 3/1923 | Switzerland | 285/373 |

*Primary Examiner*—Randolph A. Reese
*Assistant Examiner*—Anthony Knight
*Attorney, Agent, or Firm*—Peter K. Kontler

[57] ABSTRACT

The non-profiled end portions of two pipes can be coupled to each other by a ring-shaped band which has at least one axially parallel gap and circumferentially extending corrugations defining two outer chambers and at least one median chamber. Each chamber is open toward the peripheries of the pipes and each outer chamber surrounds a different pipe. Such outer chambers contain arcuate safety devices with radially innermost portions in the form of claws serving to penetrate into the material of the respective pipes when the band is tightened around the end portions of the pipes by a clamping unit which is designed to reduce the width of the gap. The median chamber of the band confines a deformable annular insert which has marginal sealing lips and serves to establish a seal between the internal surface of the band and the peripheral surfaces of end portions of the pipes when the clamping unit is actuated to reduce the diameter of the band. Each safety device includes several arcuate sections which are connected to each other and whose median portions can be movably secured to the adjacent portions of the corresponding outermost corrugations of the band.

24 Claims, 7 Drawing Sheets

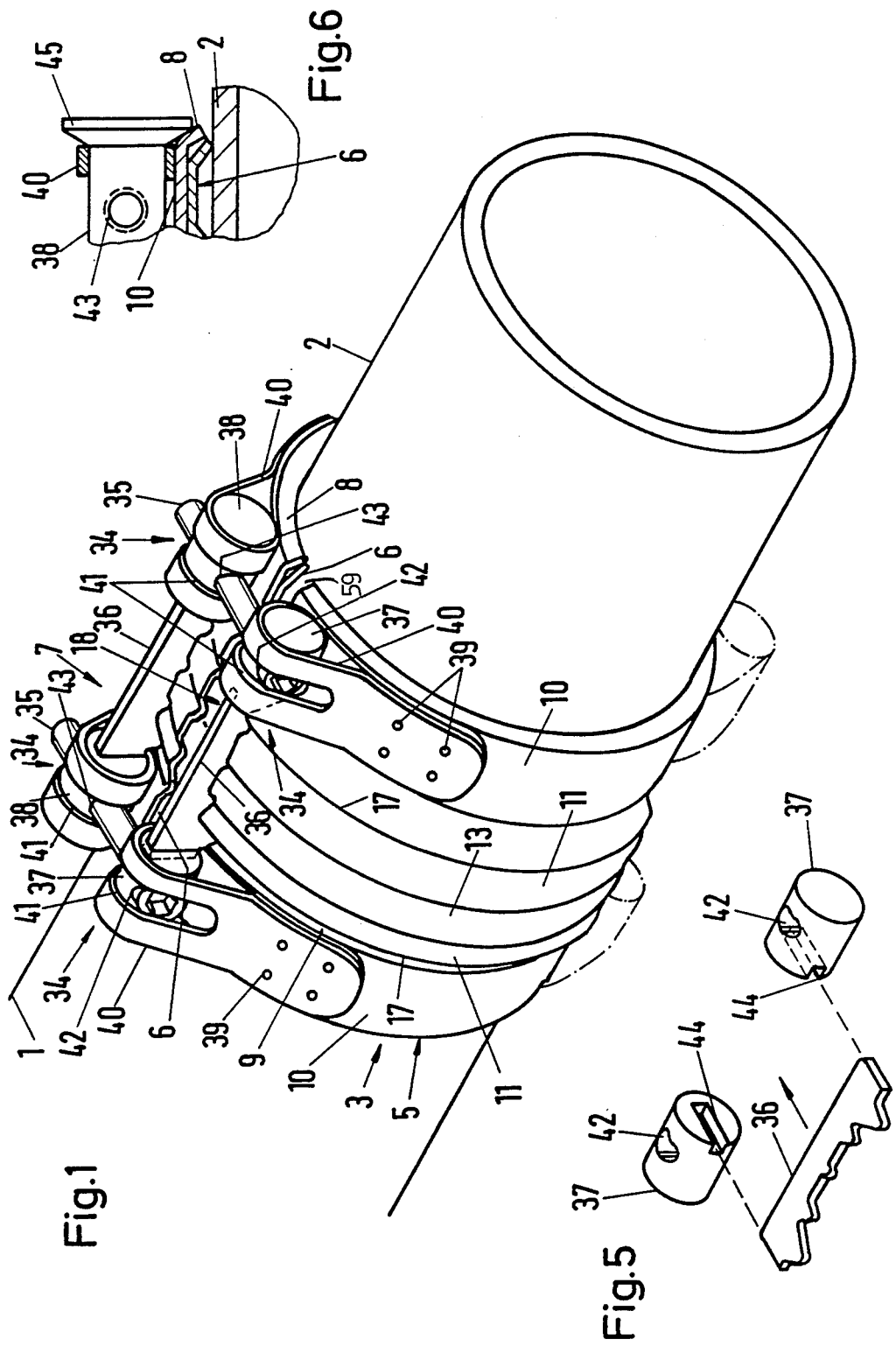

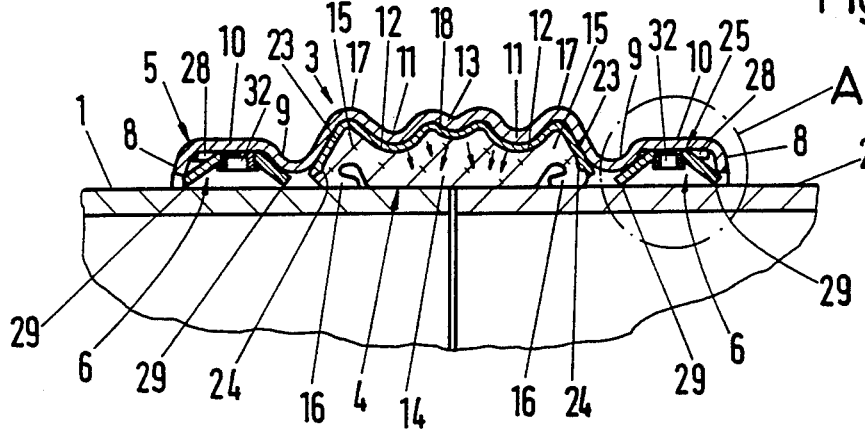
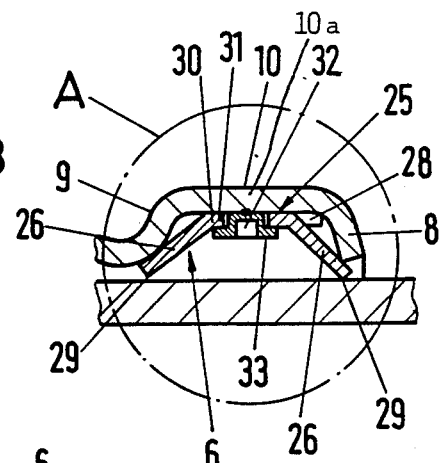
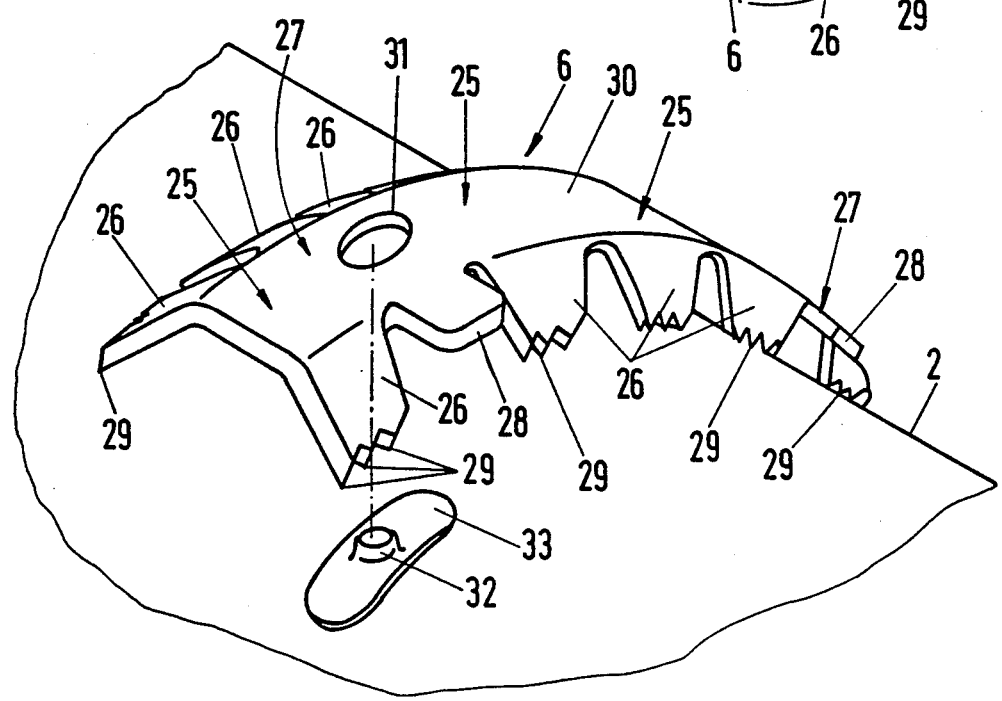

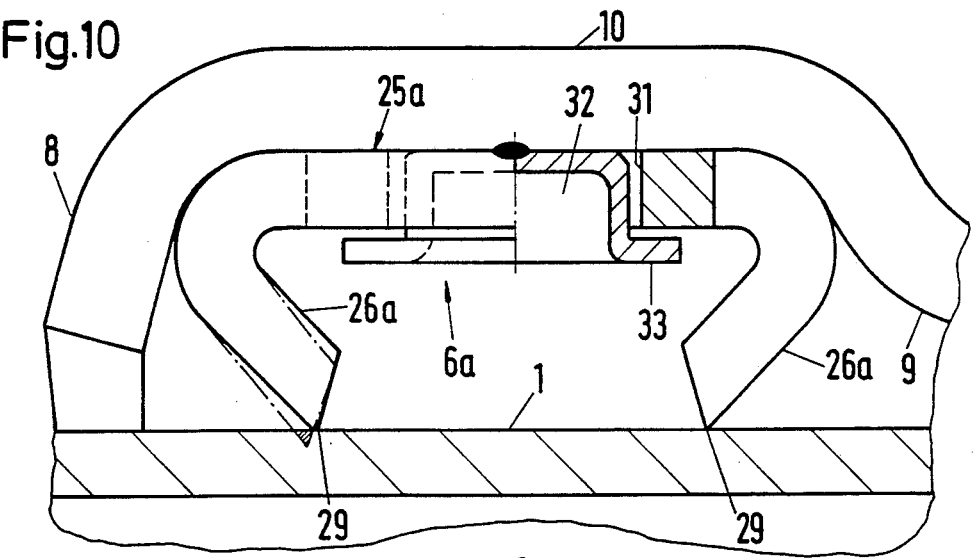
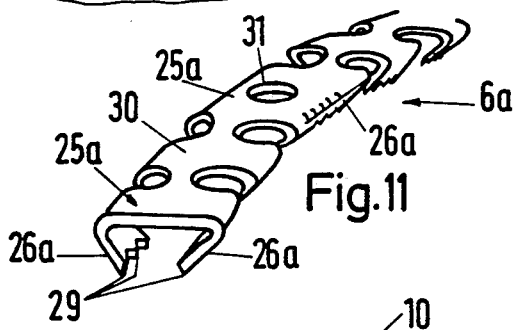
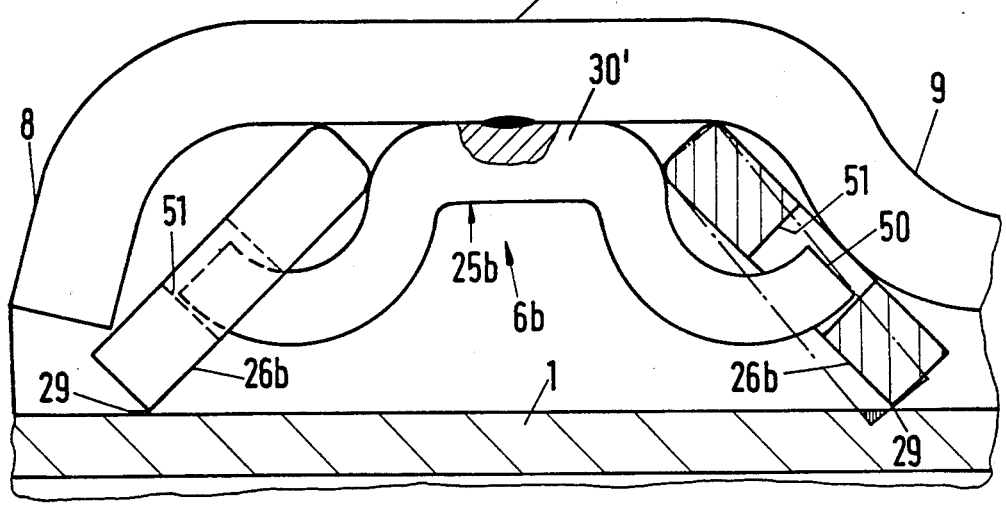
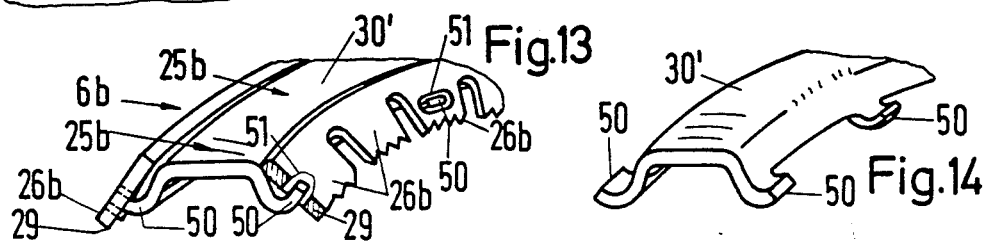
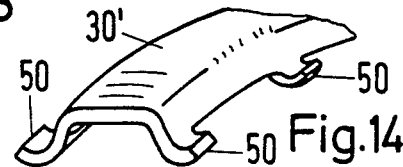

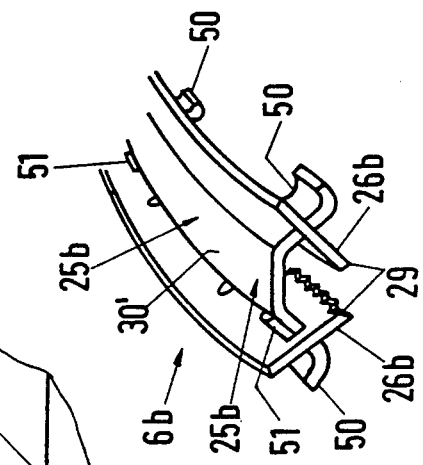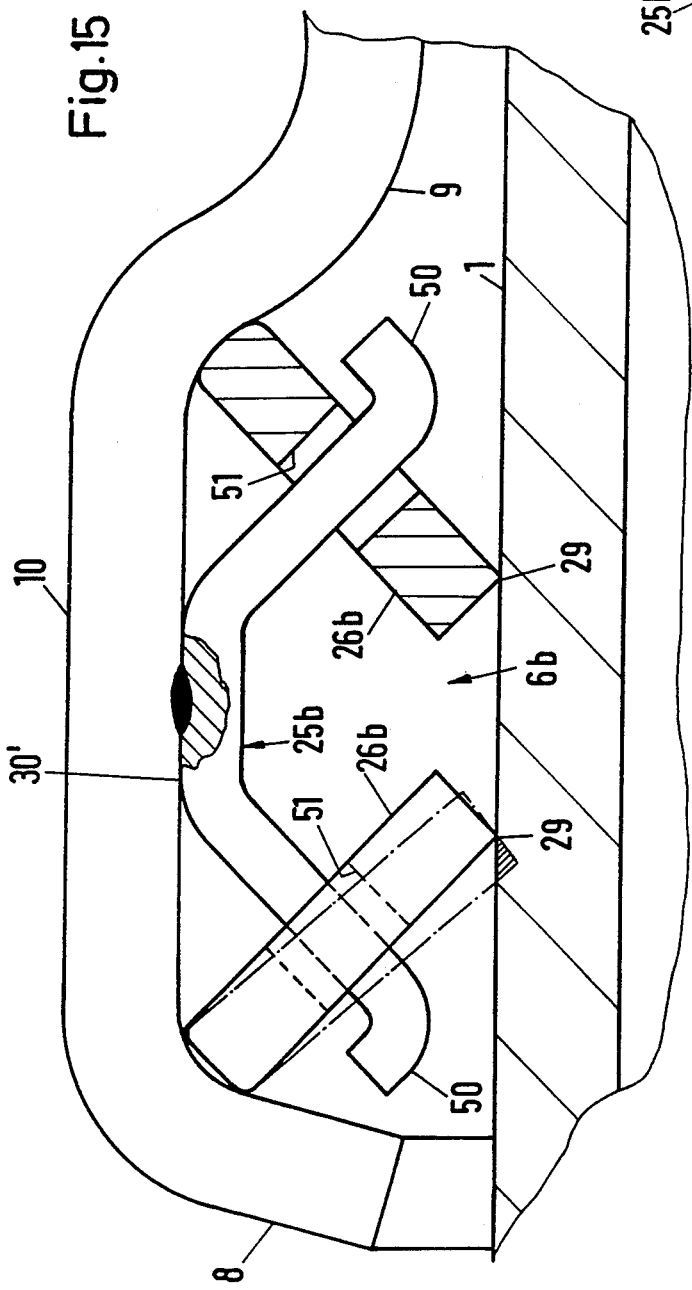

PIPE COUPLING

CROSS-REFERENCE TO RELATED CASE

The pipe coupling of the present invention constitutes an improvement over and a further development of the pipe coupling which is disclosed in commonly owned copending patent application Ser. No. 079,659 filed July 29, 1987 for "Pipe coupling" now U.S. Pat. No. 4,819,974.

BACKGROUND OF THE INVENTION

The invention relates to couplings in general, especially to pipe couplings, and more particularly to improvements in couplings of the type wherein an annular band-shaped housing surrounds the end portions of the objects to be coupled to each other and defines internal annular chambers or grooves for safety devices or gripping devices serving to penetrate into the material of the objects and to thereby hold the housing against slippage in the axial direction when the housing is tightened around the objects by means of screws, bolts and nuts or other clamping devices which reduce the width of the gap between the end portions of the housing. A coupling of the just outlined character is disclosed in the aforementioned copending patent application Ser. No. 079,659 to Zeidler now U.S. Pat. No. 4,819,974. The coupling of Zeidler further includes an elastic sleeve-like insert which is surrounded by the housing and, in turn, surrounds the end portions of the objects when the coupling is applied so that the insert establishes a reliable fluid-tight seal between the ends of the objects and the surrounding atmosphere. The housing of the coupling which is disclosed by Zeidler comprises two semi-cylindrical shells with radially outwardly extending flanges which are secured to each other by the aforementioned clamping devices. The shells are rigid castings, and they together form three internal annular grooves or chambers including two outer grooves for the safety devices and a central groove for the elastic insert. The width of the central groove (in the axial direction of the insert) is selected in such a way that a first marginal sealing lip of the insert surrounds the end portion of one object and a second marginal sealing lip of the insert surrounds the end portion of the other object. The median portion of the central groove is bounded by a cylindrical external surface and abuts a complementary cylindrical internal surface of the housing. The internal surface of the insert between the two marginal sealing lips is out of contact with the end portions of the objects, even when the clamping devices are applied to urge the lips into sealing engagement with the respective objects. This can present problems when the objects are fluid-conveying pipes and one of the pipes tends to change its inclination relative to the other pipe, i.e., when the axis of one of the pipes no longer coincides with but makes an angle of less than 180° with the axis of the other pipe. The teeth which constitute the radially innermost portions of the sealing or gripping devices in the outer grooves of the housing then act not unlike pintles, and portions of the sealing lips are likely to become disengaged from the adjacent portions of external surfaces of the corresponding pipes. Such disengagement and resulting leakage of confined fluid into the surrounding atmosphere can take place even if the pressure in the space between the sealing lips of the insert is high or very high, i.e., even if the confined fluid tends to urge the lips into sealing engagement with the external surfaces of the pipes. In addition, when one of the pipes is caused to change its inclination relative to the other pipe, some of the teeth are likely to become disengaged from the respective pipe or pipes so that the coupling permits axial shifting of one of the pipes relative to the other pipe because the retaining or gripping action of the safety devices is insufficient to hold the pipes against axial movement relative to each other, for example, when such tendency of the pipes develops simultaneously with a change in orientation of one pipe relative to the other pipe.

British Pat. No. 911,358 to Victualic discloses a pipe joint wherein the central portion of an elastic sealing ring which is confined in a rigid metallic housing is spaced apart from the adjacent portions of peripheral surfaces of the pipes.

German Offenlegungsschrift No. 34 40 258 of Klingelhöfer discloses a pipe coupling with a cylindrical housing which surrounds an elastic sealing sleeve.

German Offenlegungsschrift No. 34 43 943 of Hurter discloses a coupling which constitutes a modification of the coupling of Klingelhöfer.

U.S. Pat. No. 2,459,251 to Stillwagon discloses a threadless pipe coupling wherein the central portion of an elastic sleeve, which is confined in a rigid housing, is spaced apart from the external surfaces of the pipes.

U.S. Pat. No. 2,225,208 to Crickmer discloses a pipe coupling which is similar to that of Stillwagon.

OBJECTS AND SUMMARY OF THE INVENTION

An object of the invention is to provide a novel and improved coupling which is constructed and assembled in such a way that it offers a highly satisfactory resistance to tilting and/or other undesirable movements of one pipe relative the other object.

Another object of the invention is to provide novel and improved safety devices or gripping devices which can be employed in the above outlined coupling to hold the objects against movement toward or away from each other.

A further object of the invention is to provide a novel and improved housing and a novel and improved sealing insert for use in the above outlined coupling.

An additional object of the invention is to provide a novel and improved method of reducing the likelihood of escape of confined fluids from the pipes or other hollow objects which are attached to each other by the above outlined coupling.

Still another object of the invention is to provide a coupling wherein the end portions of the housing are secured or clamped to each other in a novel and improved way.

An additional object of the invention is to provide the coupling with novel and improved means for securing the safety or gripping devices to the housing.

A further object of the invention is to provide a versatile coupling which can be used to connect two pipes end-to-end, to connect a pipe to a solid object, to connect a pipe to a hollow object, or to connect two solid objects to each other.

Another object of the invention is to provide a coupling wherein the housing need not be made of a cast metallic or other material and wherein the teeth of the safety devices are not likely to become disengaged from the respective objects in response to slight or even pronounced tilting of one object relative to the other object.

An additional object of the invention is to provide the coupling with novel and improved means for properly orienting parts of the clamping device with reference to each other and with reference to the housing.

The invention is embodied in a coupling for neighboring unprofiled end portions of two objects, hereinafter called pipes. The coupling comprises an annular band-shaped housing (hereinafter called band) which serves to surround the end portions of the pipes and has at least one substantially axially parallel gap. The band includes a plurality of circumferentially extending corrugations including two outermost corrugations which define first chambers having open inner sides facing the peripheral surfaces of end portions of the respective pipes. Each chamber surrounds one of the end portions and each outermost corrugation has an inner and an outer end wall. The coupling further comprises an annular safety device or gripping device in each first chamber, and each safety device comprises a set of arcuate sections each of which has two end wall members with at least one of the end wall members abutting the respective end wall of the corresponding outermost corrugation. The end wall members have radially innermost portions (each of which can have a sawtooth profile) which serve to penetrate into the end portions of the respective pipes to hold the pipes against movement toward or away from each other, and at least two sections of each safety device are preferably connected to (e.g., integral with) each other. The coupling also comprises a ring-shaped or sleeve-like insert of deformable material which is disposed within the band and extends across the gap. The band defines an additional chamber between the first chambers, and the insert is disposed in the additional chamber and has deformable annular marginal sealing lips each of which is designed to surround a different pipe and each of which slopes in a direction toward the other lip. The band includes at least two additional annular corrugations which are to extend into and to provide the insert with annular hills and valleys including a median valley and two outermost hills intermediate the sealing lips, and the coupling further comprises clamping means which is operative to reduce the diameter of the band by reducing the width of the gap to thereby maintain the insert in sealing engagement with the end portions of the pipes and with the band.

The end wall members of the sections of the safety devices can diverge radially inwardly of the respective safety devices and toward the respective end walls of the outermost corrugations. The arrangement may be such that the end walls of each outermost corrugation make a first acute angle and the end wall members of the respective sections make a larger second acute angle.

Thus, the inclination of the end wall members can be such that the mutual spacing of the radially outermost portions of the end wall members (as seen in the axial direction of the annular safety devices) is less than the mutual spacing of the radially innermost portions of the end wall members of any of the sections. Alternatively, the mutual spacing of radially outermost portions of the end wall members or each section (as seen in the axial direction of the respective safety devices) can exceed the mutual spacing of innermost portions of the end wall members of the sections.

Each section can further comprise at least one projection which abuts the respective outermost corrugation and extends substantially axially of the corrugation into engagement with one of the respective end walls. The at least one projection of each section can actually engage the respective outer end wall and is flanked by two end wall members of the respective section (as seen in the circumferential direction of the respective safety device).

Each section can also comprise a web or back which is remote from the respective radially innermost portions (as seen in the radial direction of the respective safety device), and means for articulately connecting at least one end wall member of each section to the respective web. The connecting means can comprise lateral extensions on the webs and complementary sockets which are provided in the respective end wall members and into which the neighboring extensions project.

Each outermost corrugation has a central wall intermediate the respective inner and outer end walls, and the web of each section is adjacent the respective central wall and has at least one opening. Such coupling can further comprise fastener means for movably securing the sections to the respective outermost undulations. Each fastener means can comprise a plug extending through one of the openings and being affixed (e.g., spot welded) to the respective central wall, and a flange which is rigid with the plug and overlies the respective web. The flanges overlie those (inner) sides of the respective webs which face away from the respective central walls.

The coupling can comprise at least one additional safety device which is nested within at least one of the annular safety devices and includes additional end wall members flanked by the end wall members of the at least one annular safety device. Each additional end wall member has a radially innermost portion which serves to penetrate into the end portion of the corresponding pipe substantially simultaneously with the radially innermost portions of the end wall members of the at least one annular safety device.

Each section (or at least one section) can be designed in such a way that it does not have a pronounced web. Thus, at least one section of at least one of the safety devices can include intermeshing prongs which define a hinge for articulately connecting the end wall members of the at least one section to each other. Each such end wall member can include an arcuate back (not unlike the back of a comb) and a set of prongs extending from the back and meshing with the prongs of the back of the other end wall member. The radially innermost portions of the end wall members of such at least one section are inclined with reference to the prongs of the other end wall member of the at least one section. The prongs abut or are adjacent the central wall of the respective outermost corrugation. The radially innermost portions of the at least one section can slope toward each other radially inwardly of the respective annular safety device.

The clamping means can comprise a pair of heads at each side of the gap, threaded connectors each of which connects one head at one side of the gap with a head at the other side of the gap, and (optional but desirable) reinforcing members each of which connects the heads of a pair. The heads are disposed radially outwardly of the band, and the heads of each pair are preferably aligned with each other in the axial direction of the band. The external surface of the band has an undulate shape, and each reinforcing member of the clamping means is preferably provided with an undulate surface which conforms to and abuts the external surface of the band. Each head can include a round bolt whose axis is substantially parallel to the axis of the band, and the band is preferably provided with external looped portions in the form of eyelets which surround the bolts and in which the bolts can turn about their respective axes. Each eyelet is preferably provided with a slot for the respective connector. Each bolt is preferably provided with a diametrically extending hole for the respective connector and with a substantially diametrically extending external recess for a portion of the respective reinforcing member. Each reinforcing member can include or constitute a plate. One head of each pair of heads is preferably adjacent one outermost corrugation and the other head of each pair is preferably adjacent the other outermost corrugation of the band. These heads can be provided with flanges abutting the outer end walls of the respective outermost corrugations.

The band has end portions which flank the gap, and one of these end portions can be provided with an extension which extends across the gap, which is overlapped by the other end portion of the band and which overlies the adjacent portion of the insert. The extension of the one end portion of the band is disposed between the two outermost corrugations of the band (as seen in the axial direction of the band) and has corrugations conforming to the additional corrugations of the other end portion. The corrugations of the extension can also include at least two hills and a valley between the hills. The extension can be provided with arcuate end walls which diverge in a direction toward the axis of the band and abut the other end portion of the band. The insert has surfaces which abut the arcuate end walls of the extension and the end walls of the extension can be provided with reinforcing means in the form of ribs extending in the circumferential direction of the band.

The novel features which are considered as characteristic of the invention are set forth in particular in the appended claims. The improved coupling itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a perspective view of a coupling which embodies one form of the invention and is applied to the end portions of two pipes;

FIG. 2 is a fragmentary axial sectional view of the coupling of FIG. 1 and of the pipes whose end portions are sealingly secured to each other;

FIG. 3 is an enlarged view of the detail within the phantom-line circle A in FIG. 2;

FIG. 4 is an enlarged fragmentary perspective view of one of the safety devices which are employed in the coupling of FIG. 1;

FIG. 5 is an exploded perspective view of a portion of the clamping means which is employed in the coupling of FIG. 1;

FIG. 6 is a fragmentary axial sectional view of a slightly modified coupling wherein the clamping means employs bolts with flanges serving to abut the adjacent ends of the band;

FIG. 10 is a fragmentary axial sectional view of a further coupling which employs modified safety devices with the end wall members sloping radially inwardly toward the axis of the coupling and toward each other;

FIG. 11 is a fragmentary smaller-scale perspective view of the safety device which is shown in FIG. 10;

FIG. 12 is a fragmentary axial sectional view of an additional coupling with composite safety devices wherein the end wall members of each safety device are articulately connected to the respective webs;

FIG. 13 is a fragmentary smaller-scale perspective view of the safety device which is shown in FIG. 12;

FIG. 14 is a fragmentary smaller-scale perspective view of the web in the safety device of FIG. 12;

FIG. 15 is a fragmentary axial sectional view of a coupling which constitutes a modification of the coupling shown in FIGS. 12-14;

FIG. 16 is a fragmentary smaller-scale perspective view of the safety device in the coupling of FIG. 15;

DESCRIPTION OF THE PREFERRED EMBODIMENTS

Figure 7:
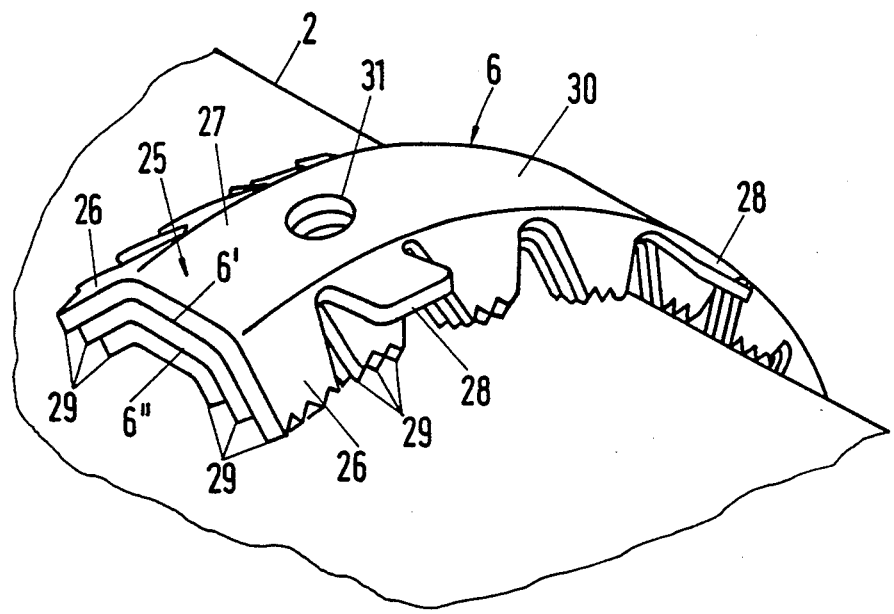
FIG. 7 is a fragmentary perspective view of a portion of a pipe and of a modified safety device which includes three annular safety devices nested within each other.

Referring first to FIGS. 1, 2, 3, 4, 5 and 8, there is shown a coupling 3 which serves to separably connect the neighboring non-profiled end portions of two coaxial or substantially coaxial pipes 1 and 2 to each other. The diameters and wall thicknesses of the pipes 1 and 2 are assumed to be identical. The coupling 3 comprises a ring-shaped housing 5 (hereinafter called band for short) which is made of a metallic sheet material and surrounds a sleeve-like insert 4 (see particularly FIG. 2) of rubber or other suitable elastomeric material. The end portions of the band 5 define an axially parallel clearance or gap 59 the width of which can be reduced by a clamping unit 7 (this clamping unit is omitted in FIG. 2 for the sake of clarity).

The band 5 has circumferentially extending corrugations including two outermost corrugations 10 and a plurality of additional corrugations including those denoted by the reference characters 11, 13 and 17 shown in FIG. 2. The outermost corrugations 10 define two first annular chambers or grooves which are open toward the peripheral surfaces of the respective pipes 1 and 2, and the additional corrugations define an additional annular chamber which is open toward the peripheral surfaces of the pipes 1, 2 and receives the aforementioned elastically deformable sleeve-like insert 4. Each of the first chambers (within the outermost corrugations 10) accommodates an annular safety device or gripping device 6 serving to hold the pipes 1 and 2 against axial movement toward or away from each other when the coupling 3 is properly applied, namely when the clamping unit 7 is activated to reduce or tend to reduce the width of the gap 59 so that the band 5 compresses and deforms the insert 4 whereby the two annular marginal elastic sealing lips 16 of the insert 4 sealingly engage the adjacent portions of the peripheral surfaces of corresponding pipes. Each of the chambers in the outermost corrugations 10 has a substantially trapeziform cross-sectional outline because the inner end walls 9 and the outer end walls 8 are inclined relative to each other so that they make an acute angle and diverge in a direction toward the axis of the respective pipe.

The additional corrugations 11 and 13 of the band 5 extend into the insert 4 and impart to the latter a complementary undulate outline including at least two outermost hills 15 and at least one valley 12 between the hills 15. The sealing lips 16 of the insert 4 slope toward the axes of the respective pipes and toward the end faces of such pipes; they are moved into larger surface-to-surface contact with the peripheral surfaces of the pipes as well as with the band 5 in response to actuation of the clamping unit 7 in a sense to reduce the width of the gap 59. If desired, the peripheral surface of the insert 4 can be provided with prefabricated circumferentially extending external hills 15 and valleys 12 so as to facilitate proper and predictable positioning of median portion 14 of the insert 4 within the confines of the band 5 before the band is caused to reduce its diameter and to press the insert into sealing engagement with the end portions of the pipes 1 and 2. As a rule, the external surface of the insert 14 will resemble a cylinder before the insert is deformed by the additional corrugations 11 and 13 of the band 5 so that it develops the aforementioned hills 15 and valleys 12. The outer end walls of the corrugations 17 are outwardly adjacent the end surfaces of the deformed insert 4.

Figure 8:
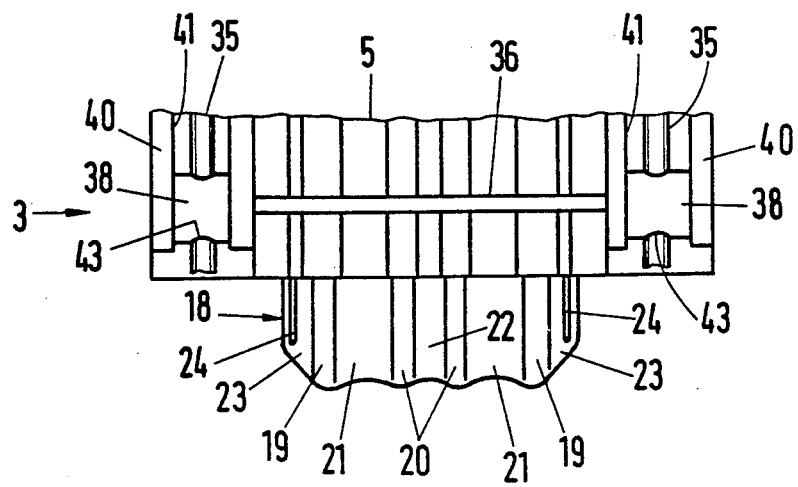
FIG. 8 is a fragmentary plan view of the band in the coupling of FIG. 1.

As can be seen in FIGS. 1, 2 and 8, one end portion of the band 5 has an extension 18 which is undulated the same way as the remaining portions of the band and extends across the gap 59 between the other end portion of the band and the adjacent portion of the external surface of the insert 4. The extension 18 prevents the material of the insert 4 from penetrating into the gap 59 in response to application of the clamping unit 7. The undulations of the extension 18 preferably match or very closely approximate those of the other end portion of the band 5. As can be seen in FIG. 8, the corrugations 19 and 20 of the extension 18 define a plurality of hills and valleys including valleys 21 each of which is flanked by a corrugation 19 and a corrugation 20, and a further valley 22 between the corrugations 20. The arcuate end walls 23 of the extension 18 diverge in a direction toward the axis of the band 5 and are preferably provided with arcuate reinforcing portions in the form of ribs 24. The end walls 23 of the extension 18 abut the outer end walls of corrugations 17 of the band 5. The corrugations 19 and 20 of the extension 18 facilitate its introduction between the other end portion of the band 5 and the adjacent portion of the insert 4 preparatory to actuation of the clamping unit 7.

The extension 18 constitutes an optional but desirable feature of the improved band 5. The utilization of an extension with end walls 23 which are inclined in a manner as shown in FIGS. 2 and 8 and are reinforced by ribs 24 or in another suitable way contributes still further to reliability of the tightening action of the band 5 around the insert 4. As shown in FIG. 2, the end walls 23 abut the inner sides of the outer walls of corrugations 17 and reinforce such end walls to even further enhance the reliability of compressing action which is exerted by the additional corrugations 17, 11, 13 of the band 5 upon the insert 4 when the clamping unit 7 is activated to reduce the width of the gap 59. The end walls 23 of the extension 18 reduce the likelihood of bulging of the insert 4 in the axial direction of the band 5 when the insert is compressed. Pronounced sealing action of the insert 4 is especially important in the region of the gap 59 between the end portions of the band 5.

FIG. 4 shows a set of arcuate sections 25 of one of the safety devices 6. Each of the sections 25 has a substantially trapeziform cross-sectional outline with two outwardly diverging end wall members 26 and a centrally located arcuate web 30 which is integral with the end wall members 26. The radially innermost portions 29 of the end wall members 26 have a sawtooth-shaped profile and can be said to constitute claws serving to penetrate into the material of the respective pipes when the clamping unit 7 is actuated to reduce the diameter of the band 5. The curvature of the web 30 of each section 25 of a safety device 6 corresponds to that of the corresponding outermost corrugation 10 of the band 5. As can be seen in FIG. 2, the mutual inclination of the end wall members 26 of a section 25 is less pronounced than that of the corresponding inner and outer end walls 9 and 10. In other words, the end walls 8 and 9 make a relatively small angle or an angle which is smaller than that between the end wall members 26 of a section 25 in the corresponding first chamber of the band 5. Otherwise stated, the inclination of end wall members 26 with reference to the axis of the band 5 is less pronounced than that of the end walls 8 and 9. Each section 25 can include one or more projections 28 in the form of substantially axially parallel lugs 28 which are adjacent or actually abut the inner sides of the central walls 10a of the corresponding outermost corrugations 10. This can be readily seen in FIG. 2. Each projection 28 can be said to form part of a truncated section 27 (see FIG. 4). That portion of the safety device 6 which is shown in FIG. 4 includes sections 25 and two sections 27. The sections 25, 27 are integral with each other. As a rule, a plurality of sections 25, 27 will jointly form a substantially ring-shaped safety device 6 which has an axially extending gap so that the safety device can be expanded prior to being slipped onto the end portion of the respective pipe.

The dimensions of each safety device 6 are or can be selected in such a way that, upon insertion into the corresponding first chamber, the end wall members 26 abut the respective end walls 8, 9 in a manner as shown in FIG. 3. Thus, the radially innermost portions of the end wall members 26 are adjacent the radially innermost portions of the respective end walls 8, 9, and the radially outermost portions of the end wall members 26 are remote from the radially outermost portions of the end walls 8 and 9. This ensures that the end walls 8, 9 force the claws 29 into the material of the respective pipes when the diameter of the band 5 is being reduced in response to activation of the clamping unit 7 in a sense to narrow the gap 59. The webs 30 of the safety devices 6 then abut the inner sides of the central walls 10a of the corresponding outermost corrugations 10. This is also shown in FIG. 3 which further shows a projection 28 abutting the inner side of the central wall 10a. The inner diameter of each safety device 6 in the region of the claws 29 is somewhat smaller than the inner diameters of the respective end walls 8 and 9 so that the claws 29 extend radially inwardly beyond the corresponding outermost corrugations 10 of the band 5.

FIG. 4 further shows that the web 30 of the illustrated safety device 6 has at least one preferably circular opening 31 in the form of a hole serving as a means for receiving with some play the plug 32 of a fastener means further including a flange 33 abutting the inner side of the web 30. The flange is spot welded to the central wall 10a of the respective outermost corrugation 10 to ensure that the safety device 6 is permanently affixed to the band 5 before the latter is caused to compress and deform the elastic insert 4. Each web 30 can be provided with two or more circumferentially spaced apart openings 31, and the coupling 3 then comprises a corresponding number of fastener means 32–33 for reliably connecting the webs 30 to the corresponding central walls 10a. The plugs 32 and flanges 33 enable the safety devices 6 to find for themselves optimum positions in the respective first chambers during activation of the clamping unit 7 so as to ensure that each claw 29 will penetrate into the material of the respective pipe 1 or 2 when the unit 7 is operated in a sense to reduce the width of the gap 59. Such automatic centering or optimum orientation of safety devices 6 in the corresponding first chambers is attributable to their trapeziform shape and to the aforediscussed manner of contacting the end wall members 26 with the adjacent end walls 8 and 9 (refer again to FIG. 3). The provision of openings 31 which receive the plugs 32 with at least some play also ensures that eventual deviations from optimum dimensions of the safety devices 6 and corrugations 10 do not affect the reliability of engagement between the claws 29 and the respective pipes in response to tightening of the band 5 around the insert 4. In other words, it is not necessary to ensure that the plugs 32 be welded exactly to the central portions of the walls 10a because minor deviations from such optimum positions of the spot welds can be compensated for by the play with which the plugs 32 are received in the corresponding openings 31.

FIGS. 1 and 5 show the details of the clamping unit 7. This clamping unit comprises a first pair of clamping heads 34 at one side of the gap 59, and a second pair of clamping heads 34 at the other side of the gap. The band 5 is provided with external looped bearings 40 in the form of eyelets each of which receives one of the clamping heads 34 in such orientation that the heads 34 of each pair have a common axis which is parallel to the axes of the pipes 1 and 2. In addition, the common axis of the pair of clamping heads 34 at one side of the gap 59 is preferably parallel to the common axis of the other pair of clamping heads. Each clamping head 34 at one side of the gap 59 is separably connected with one clamping head 34 at the other side of the gap by a threaded connector 35 which is insertable and removable by way of circumferentially extending slots 41 provided in the eyelets 40. The eyelets 40 are spot welded to the respective outermost corrugations 10 of the band 5, as at 39. The clamping unit 7 further comprises two substantially plate-like reinforcing and connecting members 36 each of which has an edge face or surface complementary to the undulate external surface of the adjacent portion of the band 5. The end portions of the reinforcing members 36 are receivable in diametrically extending external recesses 44 of cylindrical bolts 37 at one side and cylindrical bolts 38 at the other side of the gap 59. The bolts 37 constitute the clamping heads 34 at one side of the gap 59, and the bolts 38 constitute the clamping heads 34 at the other side of such gap. The holes 42 of the bolts 37 are surrounded by smooth surfaces, and each such surface includes a larger-diameter portion for the head of the respective threaded connector 35. The diametrically extending holes 43 of the bolts 38 are tapped so that they can receive the external threads on the shanks of the respective connectors 35. The heads of the connectors 35 are accessible through the slots 41 of the eyelets 40 for the bolts 37. The bolts 38 can be said to constitute nuts which mate with the respective threaded connectors 35, and the bolts 37 can be said to constitute retaining elements for the heads of the corresponding connectors 35. Each reinforcing member 36 is preferably inserted into the respective recesses 44 while the recesses extend tangentially of the band 5. The reinforcing members 36 are thereupon turned through 90 degrees so as to move their profiled edge faces or surfaces into engagement with the adjacent portions of the undulate external surface of the band 5. The inclination of one of the reinforcing members 36 relative to the band 5 during insertion into the respective recesses 44 is shown in FIG. 5. The reinforcing member 36 is thereupon turned through 90 degrees so that it extends substantially radially of the band 5 which automatically moves its profiled edge face or surface into engagement with the adjacent portion of the external surface of the band.

If desired, each of the recesses 44 can extend diametrically all the way across the respective end face of the corresponding bolt 37 or 38. The provision of recesses 44 of the type shown in FIG. 5 is preferred at this time because this automatically ensures that the reinforcing members 36 are properly inserted prior to turning them through 90 degrees into engagement with the band 5. In addition, the length of the recesses 44 can be readily selected in such a way that the profiled edge faces or surfaces of the reinforcing members 36 must be moved into pronounced frictional engagement with the adjacent portions of the external surface of the band 5. This reduces the likelihood of undue deformation of the band 5 in response to tightening around the insert 4. Proper frictional engagement between the reinforcing members 36 and the band 5 is desirable when the pipes 1 and 2 are designed to convey a fluid medium at an elevated pressure. A properly applied reinforcing member 36 will reduce the likelihood of tilting of one of the pipes relative to the other pipe. Such tilting could result in leakage of confined fluid into the surrounding atmosphere or penetration of air into the interior of the conduit or pipeline including the pipes 1 and 2. Properly applied reinforcing members 36 are especially suited to prevent a tilting or pivoting of one of the pipes relative to the other pipe in such direction that the axis of the inclined pipe would move in a plane including the gap 59 (or the locus of the gap if the width of the gap 59 is reduced to zero in response to full application of the clamping unit 7).

An advantage of loose or relatively loose mounting of bolts 37 and 38 in the respective eyelets 40 of the band 5 is that the bolts can turn in their respective eyelets when the diameter of the band is being reduced in response to rotation of the connectors 35 in directions to move each bolt 37 nearer to the adjacent bolt 38. At such time, the bolts 37 and 38 automatically turn in their eyelets 40 so as to avoid any bending of the connectors 35. The ability of the bolts 37 and 38 to turn in their respective eyelets 40 further reduces the likelihood of undue deformation of reinforcing members 36 and/or portions of the band 5.

It is possible to replace the plate-like reinforcing members 36 with cylindrical bolt- or rod-like members having corrugations which are complementary to those of the band 5. The utilization of substantially plate-like reinforcing members 36 is preferred at this time because such reinforcing members can be made at a low cost of simple sheet metal stock.

FIG. 6 shows a slight modification according to which at least one pair of bolts (FIG. 6 shows one of the bolts 38) can be provided with a flange 45, particularly a frustoconical flange, which abuts the outer end wall 8 of the respective outermost corrugation 10 of the band 5. The flanges 45 prevent outward bending of the end walls 8 in response to tightening of the band 5. It is clear that each of the bolts 37 and 38 can be provided with a conical or with an otherwise configurated flange or enlarged end portion which is capable of abutting the outer side of the respective outer end wall 8.

When the clamping unit 7 is actuated to reduce the width of the gap 59, the central walls 10a of the outermost corrugations 10 of the band 5 act upon the adjacent safety devices 6 in the radial direction of the corresponding pipes 1 and 2 so that the webs 30 of the sections 25, 27 of each safety device 6 are urged radially inwardly and exert a force upon the claws 29 which causes such claws to penetrate into the material of the respective pipes. At the same time, the end walls 8 and 9 of each corrugation 10 act upon the outer sides of the respective end wall members 26 to again urge the claws 29 into the material of the respective pipes. The claws 29 penetrate into the material of the pipes substantially radially of the pipes and thus ensure that the pipes are safely held against axial movement toward or away from each other. The end walls 8 and 9 ensure that the end wall members 26 of the sections 25 cannot yield by moving their claws 29 toward the plane of the corresponding web 30 so that the claws would merely slide along the peripheral surfaces of the pipes but would not actually penetrate into the material of the pipes. The claws 29 penetrate into the material of the pipes even though the inclination of the end wall members 26 relative to the axes of the pipes is relatively small. Such relatively small inclination of the end wall members 26 relative to the axes of the pipes 1 and 2 is desirable and advantageous because it reduces the likelihood of flexing of the end wall members 26 relative to the corresponding webs 30 when one of the pipes 1 and 2 tends to move axially toward or away from the other pipe. In other words, such inclination of the end wall members 26 prevents any axial shifting of the coupled-together pipes relative to each other. This holds true for forces which tend to reduce the distance between the pipes as well as for forces which tend to move the pipes apart, namely axially and away from each other. As the axially acting forces tend to change the inclination of end wall members 26 relative to the axes of the respective pipes, the claws 29 tend to penetrate deeper into the material of the pipes to thus further reduce the likelihood of axial shifting of the pipes relative to one another.

The arrows within the material of the insert 4 in FIG. 2 indicate the direction of forces which act from the hills and valleys and the exterior of the insert toward the external surfaces of the end portions of the respective pipes. The additional corrugations 11 and 13 of the band 5 (between the corrugations 17) cause the development of forces which maintain the median portion 14 of the insert 4 in full surface-to-surface sealing engagement with the adjacent portions of external surfaces of the pipes. This is in contrast to certain prior proposals according to which the portion of the insert between the sealing lips is not in contact with the objects to be coupled to each other. The corrugations 11 and 13 between the corrugations 17 of the band 5 ensure that the median portion 14 of the insert 4 is maintained in a pronounced sealing engagement with the pipes 1 and 2 in the region of the end faces of the pipes, namely in a region where the confined fluid medium could escape from the conduit or pipeline including the pipes 1 and 2. Such pronounced sealing action of the insert 4 is in addition to the pronounced sealing action between the pipes and the lips 16. If the pressure of fluid which is confined in the pipes 1 and 2 is so pronounced that the fluid penetrates into the interior of the insert 4 and causes the median portion 14 of the insert to move away from actual contact with the external surfaces of the pipes, the fluid is still prevented from escaping into the surrounding atmosphere because it must first overcome the sealing action of the lips 16. The sealing action of such lips increases as the pressure in the interior of the insert 4 between the lips rises. At such time, the lips 16 are forced into even stronger sealing engagement with the outer end walls of the corrugations 17 and also into more pronounced sealing engagement with the external surfaces of the respective pipes.

If one of the pipes 1 and 2 tends to change its inclination relative to the other pipe so that its axis no longer coincides with the axis of the other pipe, this normally results in a reduction of sealing action between the insert 4 and the pipes within the resulting angle which is formed by the two axes. However, such weakening of the sealing action takes place only between the median portion 14 of the insert 4 and the adjacent portions of external surfaces of the pipes. The action of the sealing lips 16 remains at least substantially unchanged. Moreover, the corrugations 10, 17, 11 and 13 impart to the band 5 a certain amount of flexibility so that it can follow eventual pivoting or tilting of one of the pipes relative to the other pipe. This ensures that even the median portion 14 of the insert 4 remains in proper sealing engagement with the pipes at both sides of the clearance between the pipes in response to eventual tilting of one pipe relative to the other pipe. In other words, the material of the median portion 14 can readily conform to eventual changes of inclination of the pipes relative to each other to remain in adequate sealing engagement with both pipe ends. As mentioned above, the band 5 can be made of a metallic sheet material and can exhibit a certain amount of flexibility, at least as compared with a band which is made of cast iron or another rigid material that is incapable of following eventual changes of inclination of one of the pipes relative to the other. The ability of the band 5 to flex due to the provision of its corrugations 10, 17, 11 and 13 further ensures that the safety devices 6 remain in proper gripping engagement with the respective pipes, even if one of the pipes changes its orientation relative to the other pipe. All in all, the improved coupling 3 is capable of standing pronounced forces which tend to move the pipes apart, pronounced forces which tend to move the pipes nearer to each other, as well as pronounced forces which tend to change the inclination of one of the pipes relative to the other. If the magnitude of bending forces is sufficient to enable one of the pipes to actually change its inclination relative to the other pipe, the flexible band 5 ensures that the safety devices 6 remain in adequate engagement with the respective pipes as well as that the insert 4 continues to prevent the confined fluid from escaping into the surrounding atmosphere.

If desired, the substantially C-shaped band 5 of FIG. 1 can be replaced with a two-piece band having two substantially semicylindrical shells each extending along an arc of 180 degrees or a little less than 180 degrees. The coupling which employs such two-piece band is then provided with two clamping units 7 including that which is shown in FIG. 1 by solid lines and that which is shown in the lower part of FIG. 1 by phantom lines. If the band 5 is made of two parts, it is advisable to make each safety device of two parts each of which extends along an arc of approximately 180 degrees. This facilitates insertion of the safety devices into the respective parts of the two-piece band. Moreover, the thus modified band would include two extensions 18 each of which would extend across one of the two gaps between the two pieces of the band.

It is further possible to replace the second clamping unit for a two-piece band with a hinge so that the two pieces of the band can be pivoted relative to each other in order to facilitate placing of the band around the end portions of the pipes which are to be coupled to each other. The hinge can employ a rod-like pintle which is parallel to the common axis of the pipes, or a flexible web-like joint between the two pieces of the band. It is even conceivable to make the band out of three pieces and to employ three clamping units 7 or one or two clamping units in conjunction with two hinges or one hinge. All such modifications will be readily understood upon perusal of the description of FIGS. 1 to 6 and 8.

The provision of fastener means including the plugs 32 and flanges 33 is desirable and advantageous because the fastener means simplify the mounting of the coupling 3 on the pipes 1 and 2. Thus, the safety devices 6 can be properly mounted in the respective first chambers (defined by the corrugations 10) in the manufacturing plant with freedom of movement relative to the respective end walls 8 and 9 so that the safety devices can assume optimum positions with reference to the corresponding corrugations 10 when the band 5 is applied around the end portions of the pipes and is tightened by the clamping unit 7. As mentioned above, the relatively large openings 31 for the plugs 32 ensure that the centering of the safety devices 6 in the corresponding corrugations 10 is not adversely affected by eventual deviations from optimum selection of spot welds which secure such plugs to the respective central walls 10a.

The coupling 3 which is shown in FIGS. 1 to 6 and 8 can be used with particular advantage in connection with pipes 2 which are made of a metallic or ceramic material. If the pipes are made of a very soft metal or of a plastic material, the safety devices 6 of the type shown in FIG. 4 are preferably used in conjunction with one or more additional safety devices 6' and 6" of the type shown in FIG. 7. Thus, a safety device 6 of the type shown in FIG. 4 receives a second safety device 6', and the safety device 6' receives a third safety device 6". The safety devices 6' and 6" may be identical with the safety device 6 except that their end wall members 26 are somewhat shorter so as to ensure that the claws 29 of all end wall members are located in a common cylindrical plane in order to ensure simultaneous engagement between such claws and the external surface of the corresponding pipe (such as the pipe 2 which is shown in FIG. 7). The provision of numerous additional claws 29 (on the safety devices 6" and 6' which are nested in each other and in the safety device 6) ensures that the composite safety device of FIG. 7 can properly hold the pipe 2 against axial movement relative to the other pipe when the band 5 (not shown in FIG. 7) is tightened around this composite safety device. Another important advantage of the safety device which is shown in FIG. 7 is that the band need not be applied with a great force because the number of claws 29 is sufficiently large to ensure adequate engagement between all three safety devices 6, 6', 6" and a plastic pipe even if the claws are not caused to penetrate well into the material of such pipe.

The composite safety device of FIG. 7 can be modified in a number of ways without departing from the spirit of the invention. For example, a composite safety device can be assembled of only two discrete safety devices, such as 6 and 6' or 6' and 6". Furthermore, the number of safety devices which are nested into each other can be increased to four or even more if the nature of the material of pipes requires such multiplication of individual safety devices. Still further, the projections 28 can be omitted or such projections can be provided on the outermost safety device 6 as well as on at least one of the inner safety devices 6', 6".

Figure 9:
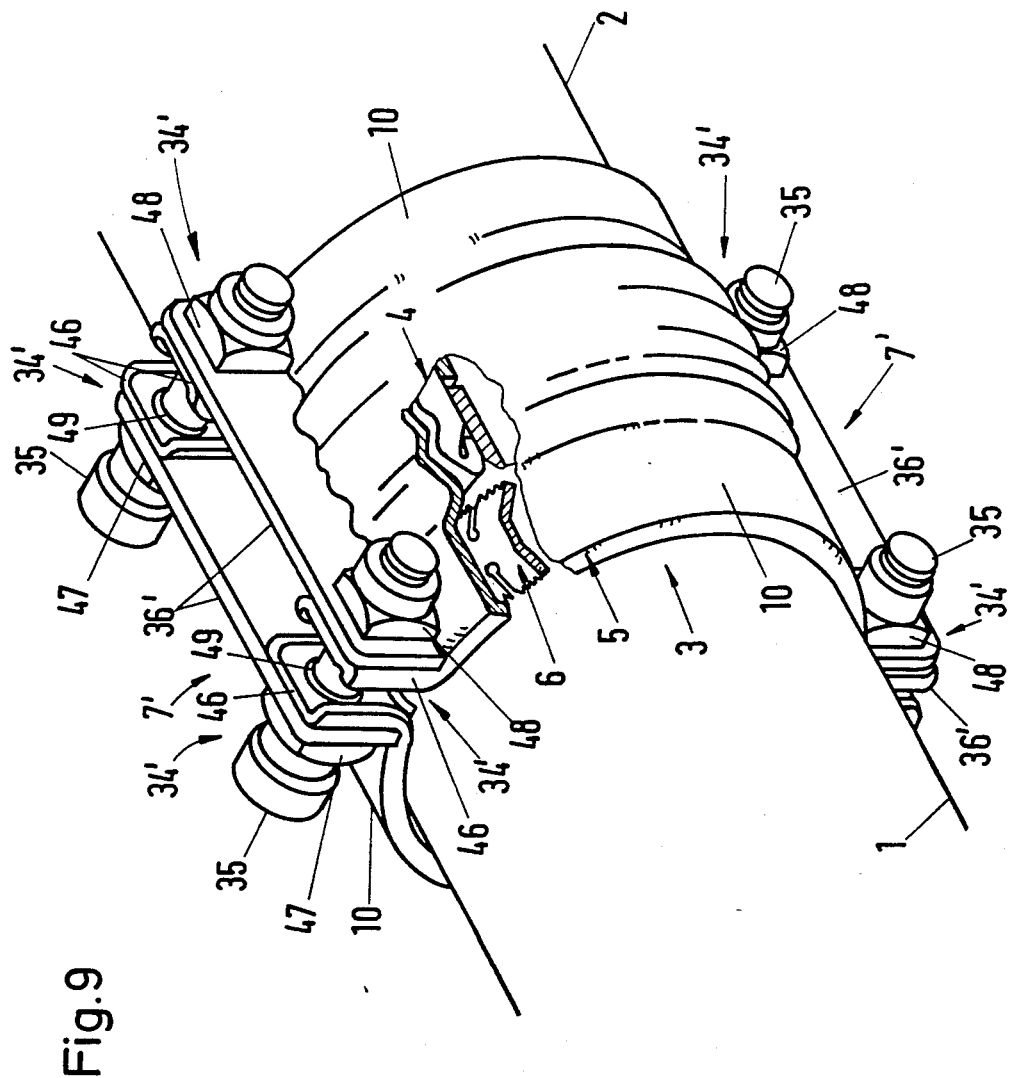
FIG. 9 is a perspective view of a different coupling which employs modified clamping means.

FIG. 9 shows a modified coupling 3 wherein the band 5 includes two semicylindrical halves and the coupling includes two clamping units 7'. Save for its two-piece design, the band 5 is or can be identical with the band 5 of FIG. 1. In other words, the band can again comprise two outermost corrugations 10 and several additional corrugations between the corrugations 10.

Each clamping unit 7' comprises a plate-like reinforcing member 36' which is analogous to the reinforcing member 36 of FIG. 5 except that its end portions are provided with holes for the threaded connectors 35. The inner edge faces of the reinforcing members 36' have a configuration which is complementary to that of the adjacent portions of the external surface of the two-piece band 5.

Each half of the band 5 has two radially extending end portions or flanges 46 which are also provided with openings for the threaded connectors 35. Two of the clamping heads 34' comprise nuts 48 which mate with the externally threaded shanks of the respective connectors 35. The other two clamping heads 34' have rings 47 which are adjacent the heads of the connectors 35 and may have cylindrical extensions 49 passing through the corresponding flanges 46 of the band 5. The rings 47 have smooth internal surfaces surrounding the openings for the connectors 35.

FIGS. 10 and 11 show a portion of a modified coupling wherein the band is or can be identical with the band 5 of FIG. 1. The illustrated safety device 6a has a set of interconnected sections 25a each having mutually inclined end wall members 26a provided with claws 29 for penetration into the material of the respective pipe, such as the pipe 1 of FIG. 10. FIG. 10 further shows the manner of spot welding the plug 32 to the inner side of the central wall of the respective outermost corrugation 10. The plug 32 is received with play in the opening 31 of the web 30 forming part of the respective section 25a. The flange 33 is adjacent the inner side of the web 30 so as to allow for automatic centering of the safety device 6a in response to tightening of the band around the pipe 1. In contrast to the safety device 6 of FIG. 4, the safety device 6a has end wall members 26a which are inclined toward each other and toward the axis of the pipe 1 so that they tend to move nearer to each other in response to a reduction of the diameter of the band. Thus, the distance between the claws 29 of the two end wall members 26a shown in FIG. 10 is less than the distance between the radially outermost portions of such end wall members. This is in contrast to the mutual inclination of end wall members 26 in FIG. 4 wherein the claws 29 at the radially innermost portions of a pair of end wall members 26 are more distant from each other than the radially outermost portions of such end wall members. As can be seen in FIG. 11, each section 25a comprises two pairs of end wall members 26a. Furthermore, the projections 28 of FIG. 4 are omitted.

An advantage of the embodiment which is shown in FIGS. 10 and 11 is that the radially innermost portions of the end wall members 26a do not bear directly against the radially innermost portions of the adjacent outer end walls 8 and 9. This reduces the tendency of the corrugation 10 to flatten out in response to tightening of the band around the pipes.

An important advantage of the improved coupling 3 is that the additional undulations 11, 13 and 17 of the band 5 bring about pronounced compression of the median portion 14 of the insert 4 so as to establish a reliable seal not only between the lips 16 and the end portions of the respective pipes 1 and 2 but also between the insert 4 and those portions of the pipes which are immediately adjacent the pipe ends. Consequently, the sealing action of the insert 4 is much more reliable than that of conventional inserts which engage the pipes only with individual sealing lips. As a rule, the lips 16 become effective to prevent escape of fluid from the pipes 1 and 2 only when the pressure of the fluid suffices to overcome the resistance which the median portion 14 of the insert 4 offers to expansion radially outwardly and away from the external surfaces of the pipes. However, since the sealing action of the lips 16 increases with increasing pressure of the fluid between them (within the median portion 14), the possibility that the median portion 14 may be shifted radially outwardly and away from the external surfaces of the pipes does not prevent the improved coupling from establishing a seal which is at least as reliable as those which can be established by conventional couplings. As also explained above, the sealing action is not reduced if one of the pipes 1, 2 is inclined relative to the other pipe because the band 5 is flexible so that the safety devices 6 can remain in proper gripping engagement with the respective pipes and the compressing action of the band 5 does not change appreciably if the band is caused to flex as a result of angular movement of one of the pipes relative to the other. At least some material of the insert 4 will migrate in response to bending of the conduit or pipeline including the pipes 1 and 2 so that such material is shifted from the regions where the insert 14 undergoes more pronounced compression into regions where the compression is less pronounced in order to further ensure adequate sealing of the fluid which is confined in the pipes from the surrounding atmosphere.

Another important advantage of the improved coupling is that the band 5 can be produced at a reasonable cost from metallic sheet material by the simple expedient of corrugating the band in a manner as shown in FIGS. 2 and 8. Such corrugating operation is much less expensive than the casting of bands from a molten metallic material. The inclination of the end wall members 26 relative to the axes of the pipes 1 and 2 is preferably selected in such a way that the claws 29 have sharp edges adjacent the external surfaces of the respective pipes. This ensures ready penetration of such sharp edges into the material of the pipes in response to tightening of the band 5. If one of the pipes tends to move axially and away from the other pipe, the end wall members 26 tend to change their inclination relative to the axes of the respective pipes and thereby compel the claws 29 to penetrate deeper into the material of the respective pipes. Consequently, the resistance of safety devices 6 to axial shifting of the pipes away from each other increases progressively with increasing force which is being applied to move one of the pipes away from the other. One end wall member 26 of each section 25 of a safety device 6 tends to increase its inclination relative to the axis of the corresponding pipe 1 or 2 when the one pipe is pulled away from the other pipe while the other end wall member 26 then tends to reduce its inclination relative to the axis of such pipe. Inversely, the other end wall member 26 tends to increase its inclination relative to the axis of the pipe when the pipe is being pushed toward the other pipe while the one end wall member 26 at such time tends to reduce its inclination relative to the pipe axis.

Resistance of the coupling 3 to axial movements of the pipes 1 and 2 relative to each other is particularly important and desirable if the median portion 14 of the insert 4 is provided with a radially inwardly extending internal rib such as the rib shown in FIG. 1 of the aforementioned copending patent application Ser. No. 079,659 of Zeidler. Axial movability of the pipes relative to each other while they are being separated by a rib which extends into the space between their end faces could result in practically immediate destruction of the rib.

Axial positioning of the pipes is equally important and desirable when the coupling 3 is affixed to a stationary support and receives the end portions of the pipes. Such fixed coupling can be used with equal advantage when it serves as a holder for a single pipe which is to be held against axial movement, for example, in response to heating or cooling and attendant thermal expansion or contraction. In such instances, the single pipe can be said to constitute two integrally connected objects having end portions confined within the fixed coupling. For example, the fixed coupling can be secured to a wall and can grasp a single pipe, either close to the end or close to the central portion of such pipe, to prevent the pipe from moving axially relative to the wall, at least in the region which is surrounded by the band of the coupling.

While it is conceivable to replace the outermost corrugations 10 with simple cylindrical portions of the band 5, provision of corrugations which define (first) chambers for the safety devices is preferred because the end walls 8 and 9 of the corrugations 10 prevent undue flexing of the end wall members of the safety devices when the band 5 is tightened around two pipes or around two objects which constitute integral parts of a single pipe and have integral end portions confined within the band. The radial clamping action of the band 5 is converted practically fully into forces acting upon the claws 29 substantially radially of the respective pipes to ensure predictable penetration of claws into the material of the pipes. Such predictable penetration will take place even if the inclination of the end wall members 26 relative to the axes of the respective pipes is relatively small (see FIG. 3), namely much smaller than the inclination of the end walls 8, 9 of the respective corrugations 10. As mentioned above, an advantage of end wall members which are inclined in such a way that the distance between their claws 29 in the axial direction of the pipes exceeds the distance between the radially outermost portions is that such end wall members are acted upon by the adjacent end walls 8 and 9 close to the respective claws 29 which further promotes the penetration of such claws into the material of the respective pipes. In other words, the claws 29 are urged radially inwardly by the webs 30 which are acted upon by the central walls 10a of the respective corrugations 10, as well as by the end walls 8 and 9 which act upon the end wall members close to the respective claws 29.

As shown in FIG. 2, the projections 28 of the sections 25 of safety devices 6 abut or are closely adjacent the radially outermost portions of the respective outer end walls 8. This ensures that the safety devices 6 remain properly centered in the respective first chambers, even in response to application of axially oriented forces upon one or both pipes. The projections 28 are closely adjacent the inner sides of the respective central walls 10a. Such positioning of the projections 28 relative to the respective corrugations 10 is desirable and advantageous because the projections 28 are less likely to cause a spreading of the respective outer end walls 8 away from the associated inner end walls 9, i.e., a flattening of the respective corrugations 10 in response to tensioning of the band 5. This will be readily appreciated since the bending or flexing action of a projection 28 which would engage the respective outer end wall 8 close to the external surface of the respective pipe would be much more pronounced if the respective pipe were pulled in a direction away from the other pipe. Referring to FIG. 2 and looking at the left-hand projection 28, the lever arm of this projection upon the adjacent left-hand outer end wall 8 is minimal but would be much more pronounced and more effective to bend the end wall 8 if the projection 28 were located close to the external surface of the pipe 1. The main difference between the gripping action of the end wall members 26a shown in FIGS. 10-11 and that of the end wall members 26 of FIG. 4 is that the claws 29 of the end wall members 26a are nearer to each other than the radially outermost portions of such end wall members. Consequently, and as stated above, the end wall members 26a are less likely to spread the adjacent end walls 8, 9 with attendant potential flattening of the corrugation 10 in response to tightening of the band around the pipes. The reason is that the outer sides of major portions of the end wall members 26a are remote from the inner sides of the adjacent end walls 8 and 9 so that the end wall 8 does not tend to move its radially innermost portion away from the radially innermost portion of the end wall 9 and vice versa when the band is being tightened around the pipes. The fact that the radially outermost portions of the end wall members 26a abut or may abut the radially outermost portions of the end walls 8 and 9 is of no consequence because the spreading action of such radially outermost portions of the end wall members 26a is negligible or nil.

FIGS. 12, 13 and 14 illustrate a portion of a further coupling which employs modified safety devices 6b. The web 30' of each section 25b of the safety device 6b shown in FIG. 12 has several laterally extending projections or extensions 50 received in complementary sockets 51 of the respective end wall members 26b. Such end wall members are tiltable relative to the web 30' so that they can assume optimum positions when inserted between the end walls 9, 10 of the respective outermost convolution 10. The mutual inclination of end wall members 26b is the same as shown in FIG. 4 for the end wall members 26. In other words, the mutual spacing of claws 29 shown in FIG. 12 is greater than the mutual spacing of radially outermost portions of the end wall members 26b. The number of projections 50 need not match the number of sections 25b. For example, it suffices to provide two, three or four pairs of projections 50 for an entire safety device 6b. As can be seen in FIG. 12, the radially outermost portions of the end wall members 26a abut the respective web 30' while the radially innermost portions of the end wall members 26b abut only the pipe 1. Intermediate portions of the right-hand end wall members 26b abut the inner end wall 9 of the illustrated corrugation 10. An advantage of the structure which is shown in FIGS. 12-14 is that the end wall members 26b are even more likely to find optimum positions of engagement with the web 30', end walls 8, 9 and pipe 1 when the band is tightened by the corresponding clamping unit or units (not shown in FIGS. 12-14). Furthermore, the flanges 33 and plugs 32 can be omitted because the web 30' of each section 25b or of some sections 25b of a safety device 6b can be spot welded directly to the central wall of the respective outermost corrugation 10. However, it is equally within the purview of the invention to replace the spot welds between the webs 30' and the respective outermost corrugations 10 with fastener means including one or more plugs 32 and flanges 33 of the type shown in FIG. 4.

The embodiment which is shown in FIGS. 15 and 16 differs from the embodiments of FIGS. 12-14 primarily or exclusively in that the mutual inclination of the end wall members 26b of the safety device 6b is reversed. Thus, the distance between the claws 29 of the end wall members 26b shown in FIG. 15 is less than the distance between the radially outermost portions of such end wall members. The manner of articulately connecting the end wall members 26b to the web 30' of the respective section 25b of the safety device 6b is clearly analogous to that which is shown in FIG. 12. The outermost portions of the end wall members 26b engage the corrugation 10 of FIG. 15 in regions where the outer and inner end walls 8, 9 meet the central wall of the corrugation 10. An advantage of this design is the same as that of the embodiment which is shown in FIGS. 10 and 11, namely that the end wall members 26b are remote from the radially innermost portions of the end walls 8, 9 so that they do not tend to flatten the corrugation 10 when the band including such corrugation is tightened around the pipes.

An advantage of the embodiments which are shown in FIGS. 12-14 and 15-16 is that the end wall members 26b are subjected to negligible bending stresses. The reason is that these end wall members can find optimum positions with reference to the pipes and with reference to the corrugations 10 when the band is tightened around the pipes. It has been found that the useful life of safety devices 6b is surprisingly long because the end wall members 26b of the sections 25b can readily change their inclination in response to increasing or decreasing axial stressing, namely in response to the application of forces which tend to pull the pipes apart or to push one of the pipes toward the other pipe.

Figure 17:
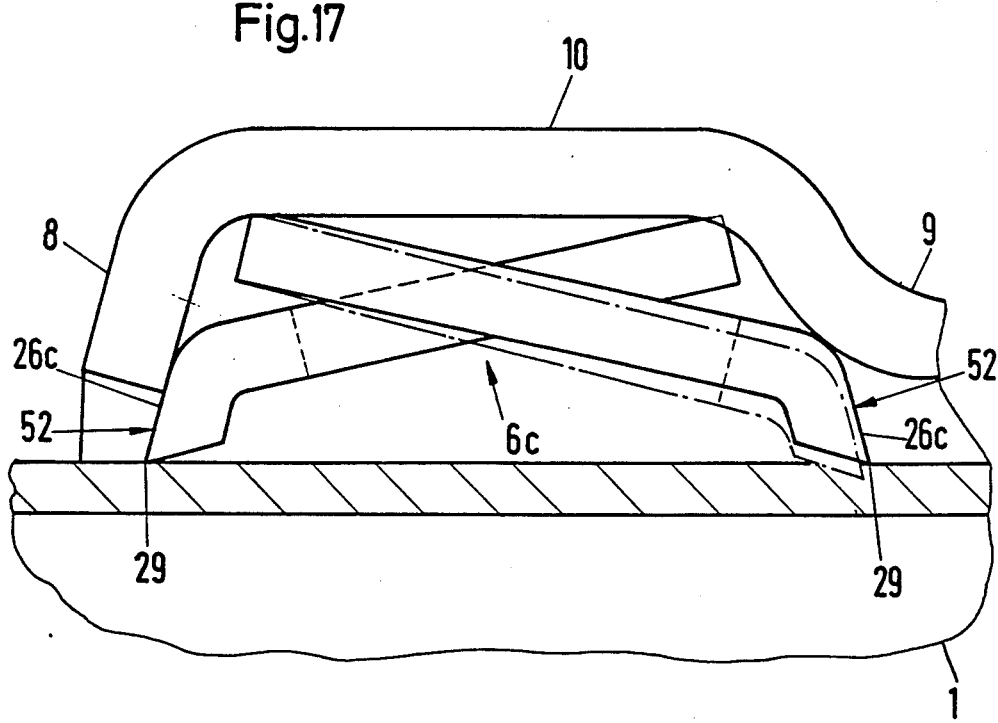
FIG. 17 is a fragmentary axial sectional view of a coupling with modified safety devices each of which includes two comb-like end wall members.
Figure 18:
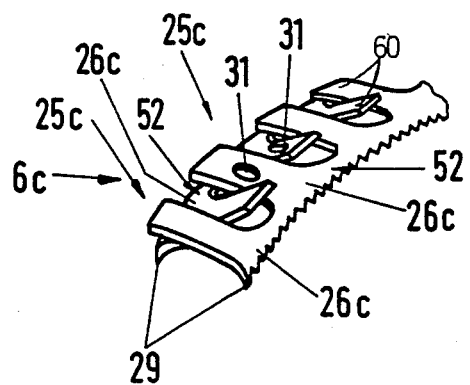
FIG. 18 is a fragmentary smaller-scale perspective view of the safety device which is shown in FIG. 17.

FIGS. 17 and 18 show a further embodiment of the improved coupling wherein the safety device 6c includes two separable parts each comprising a substantially comb-like member 52. Each member 52 has an elongated end wall member 26c provided with claws 29 and a plurality of prongs 60. The prongs 60 of one of the members 52 mate with the prongs 60 of the other member 52. The end wall members 26c constitute the backs of the respective members 52 and are integral with the corresponding sets of prongs 60. The tips of the prongs 60 abut the radially outermost portions of the respective end walls 8 and 9, and the end wall members 26c abut the respective end walls with their radially outermost portions. Radially innermost portions which carry the claws 29 are more distant from each other than the radially outermost portions of the end wall members 26c. Each prong 60 is inclined relative to the respective end wall member 26c as well as to the prongs of the other member 52. The prongs 60 can be said to jointly constitute a hinge which connects the end wall members 26c to each other in such a way that each of the members 52 automatically finds an optimum position in the respective first chamber when the band is tightened around the pipes. Some of the prongs 60 are provided with openings 31 for fastener means 32, 33 of the type shown in FIG. 4. Each pair of neighboring prongs 60 and the corresponding portions of the end wall members 26c can be said to constitute a section 25c of the safety device 6c.

An advantage of the embodiment which is shown in FIGS. 17 and 18 is that each of the members 52 engages the respective corrugation 10 at two spaced-apart locations to thus ensure proper transfer of forces from the corrugation 10 to the claws 29. The two locations of engagement of each member 52 with the corrugation 10 are spaced apart from each other in the radial direction of the corrugation. At the same time, the members 52 ensure that each end wall member 26c which abuts the inner end wall 9 can be tilted relative to each end wall member 26c which abuts the outer end wall 8 and vice versa. This ensures that the members 52 can find optimum positions for penetration of the claws 29 into the material of the respective pipe in response to tightening of the band. Moreover, the members 52 can find optimum positions for insertion into the respective first chamber preparatory to application of the band around one or more pipes. The feature that the end wall members 26c are bent relative to the corresponding sets of prongs 60 is desirable and advantageous because the end walls 8 and 9 are more likely to force the corresponding claws 29 radially inwardly into the material of the respective pipe or pipes.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A coupling for neighboring unprofiled end portions of two objects, such as pipes, comprising an annular band arranged to surround the end portions of the objects and having at least one substantially axially parallel gap, said band comprising a plurality of circumferentially extending corrugations including two outermost corrugations defining first chambers which have open inner sides and each of which is arranged to surround the end portion of a different one of the objects and at least two additional corrugations between said outermost corrugations, said additional corrugations defining an additional chamber which is open toward the axis of said band, each of said outermost corrugations having an inner and an outer end wall; an annular safety device in each of said first chambers, each of said devices including a set of arcuate sections each having two end wall members with at least one of the end wall members abutting the respective end wall of the corresponding outermost corrugation, said end wall members having radially innermost portions arranged to penetrate into the end portions of the respective objects, at least two sections of each of said devices being connected to each other; a ring-shaped insert of deformable material disposed in said additional chamber, extending across said gap and having deformable annular marginal sealing lips each arranged to surround the end portion of a different one of the objects and each sloping in a direction toward the other of said lips, said additional annular corrugations being arranged to extend into and to provide the insert with annular hills and valleys including a median valley and two outermost hills intermediate said sealing lips; and clamping means operative to reduce the diameter of said band by reducing the width of said gap to thereby maintain said insert in sealing engagement with the end portions of the objects and with said band.

2. The coupling of claim 1, wherein the end wall members of said sections diverge radially inwardly of the respective safety devices and toward the respective end walls of said outermost corrugations, the radially innermost portions of all of said end wall members having claws, the end walls of each of said outermost corrugations making a first acute angle and the end wall members of said sections making a larger second acute angle.

3. The coupling of claim 1, wherein said end wall members further have radially outermost portions and the mutual spacing of the outermost portions of the end wall members of each of said sections in the axial direction of said annular safety devices being less than the mutual spacing of the innermost portions of the end wall members of said sections.

4. The coupling of claim 1, wherein each of said sections further comprises at least one projection abutting the respective outermost corrugation and extending substantially axially of such corrugation into engagement with one of the respective end walls.

5. The coupling of claim 4, wherein said at least one projection of each of said sections engages the respective outer end wall and is flanked by two end wall members of the respective section as seen in the circumferential direction of the corresponding safety device.

6. The coupling of claim 1, wherein said end wall members further have radially outermost portions and the mutual spacing of the outermost portions of the end wall members of each of said sections in the axial direction of said annular safety devices exceeds the mutual spacing of the innermost portions of the end wall members of said sections.

7. The coupling of claim 1, wherein each of said sections further comprises a web which is remote from the respective radially innermost portions in the radial direction of the respective annular safety device, and means for articulately connecting at least one end wall member of each of said sections to the respective web.

8. The coupling of claim 7, wherein said connecting means comprises lateral extensions provided on said webs and complementary sockets provided for said extensions in the respective end wall members.

9. The coupling of claim 1, wherein each of said outermost corrugations has a central wall intermediate the respective inner and outer end walls and each of said sections further comprises a web adjacent the respective central wall and having at least one opening, and further comprising fastener means for movably securing said sections to the respective outermost corrugations, each of said fastener means including a plug extending through one of said openings and affixed to the respective central wall and a flange rigid with the plug and overlying the respective web.

10. The coupling of claim 9, wherein each of said webs has an inner side facing toward and an outer side facing away from the respective central wall, said flanges overlying the inner sides of the respective webs and said plugs being spot welded to the respective central walls.

11. The coupling of claim 1, further comprising at least one additional safety device disposed within at least one of said annular safety devices and including additional end wall members flanked by the end wall members of the at least one annular safety device, each of said additional end wall members having a radially innermost portion arranged to penetrate into the end portion of the respective object substantially simultaneously with the innermost portions of the end wall members of said at least one annular safety device.

12. The coupling of claim 1, wherein the wall members of at least one section of at least one of said safety devices include intermeshing prongs defining a hinge for articulately connecting said wall members to each other.

13. The coupling of claim 12, wherein the innermost portions of wall members of said at least one section are adjacent the inner and outer end walls of the respective outermost corrugation and the prongs of one end wall member of said at least one section are inclined with reference to the prongs of the other end wall member of said at least one section, said outermost corrugations having central walls between the respective inner and outer end walls and said prongs abutting or being adjacent the central wall of the respective outermost corrugation.

14. The coupling of claim 12, wherein the radially innermost portions of said at least one section slope toward each other radially inwardly of the respective annular safety device.

15. The coupling of claim 1, wherein said clamping means comprises a pair of heads at each side of said gap, threaded connectors each connecting one head at one side of the gap with a head at the other side of the gap, and reinforcing members each connecting a pair of said heads.

16. The coupling of claim 15, wherein said heads are disposed radially outwardly of said band and the heads of each pair are aligned with each other in the axial direction of said band.

17. The coupling of claim 15, wherein said band has an undulate external surface and each of said reinforcing members has an undulate surface conforming to and abutting to the external surface of said band.

18. The coupling of claim 15, wherein each of said heads includes a round bolt whose axis is substantially parallel to the axis of said band, said band having external eyelets surrounding said bolts, each of said eyelets having a slot for the respective connector.

19. The coupling of claim 18, wherein each of said bolts has a substantially diametrically extending hole for the respective connector and a substantially dimetrically extending external recess for a portion of the respective reinforcing member.

20. The coupling of claim 15, wherein each of said reinforcing members includes a plate.

21. The coupling of claim 15, wherein one head of each pair is adjacent one and the other head of each pair is adjacent the other outermost corrugation of said band, said heads having flanges abutting the outer end walls of the respective outermrost corrugations.

22. The coupling of claim 1, wherein said band has two end portions flanking said gap and one of said end portions of the band includes an extension extending across said gap, being overlapped by the other of said end portions of the band and overlapping said insert, said extension being disposed between said outermost corrugations and having corrugations conforming to the additional corrugations of said other end portion of said band.

23. The coupling of claim 22, wherein the corrugations of said extension include at least one pair of hills and a valley between said hills.

24. The coupling of claim 22, wherein said extension has arcuate end walls which diverge in a direction toward the axis of said band and abut said other end portion of the band, said insert having surfaces abutting the arcuate end walls of said extension and the end walls of said extension having reinforcing portions extending in the circumferential direction of said band.

* * * * *